United States Patent
Chuang et al.

(10) Patent No.: US 7,870,279 B2
(45) Date of Patent: Jan. 11, 2011

(54) METHOD AND APPARATUS FOR SCANNING, PERSONALIZING, AND CASTING MULTIMEDIA DATA STREAMS VIA A COMMUNICATION NETWORK AND TELEVISION

(75) Inventors: Wesley Chuang, Newburry Park, CA (US); Son Dao, Northridge, CA (US); Asha Vellaikal, Menlo Park, CA (US); Greg Kaestle, Woodland Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 811 days.

(21) Appl. No.: 10/315,912

(22) Filed: Dec. 9, 2002
(Under 37 CFR 1.47)

(65) Prior Publication Data

US 2004/0111465 A1 Jun. 10, 2004

(51) Int. Cl.
*G06F 15/16* (2006.01)
(52) U.S. Cl. .............. 709/231; 709/203; 709/219; 709/230; 725/114; 725/32; 725/33; 725/34; 725/35; 386/54; 386/73
(58) Field of Classification Search .............. 709/203, 709/219, 230, 231; 725/46, 53, 63, 32–36, 725/114; 386/54, 73
See application file for complete search history.

(56) References Cited

U.S. PATENT DOCUMENTS

| | | | | |
|---|---|---|---|---|
| 5,848,396 A | * | 12/1998 | Gerace | 705/10 |
| 6,353,929 B1 | * | 3/2002 | Houston | 725/20 |
| 6,654,735 B1 | * | 11/2003 | Eichstaedt et al. | 707/3 |
| 7,051,277 B2 | * | 5/2006 | Kephart et al. | 715/530 |
| 7,185,049 B1 | * | 2/2007 | Benitez et al. | 709/203 |
| 2002/0078452 A1 | * | 6/2002 | Devara | 725/44 |
| 2002/0087979 A1 | * | 7/2002 | Dudkiewicz et al. | 725/34 |
| 2003/0074447 A1 | * | 4/2003 | Rafey et al. | 709/225 |
| 2004/0006628 A1 | * | 1/2004 | Shepard et al. | 709/228 |
| 2004/0025180 A1 | * | 2/2004 | Begeja et al. | 725/46 |
| 2004/0111465 A1 | | 6/2004 | Chuang et al. | |
| 2004/0170321 A1 | * | 9/2004 | Gong et al. | 382/173 |

* cited by examiner

*Primary Examiner*—Saleh Najjar
*Assistant Examiner*—Thuong T Nguyen
(74) *Attorney, Agent, or Firm*—Tope-McKay & Assoc.

(57) ABSTRACT

A streaming data filtering method and apparatus utilizing users' profiles to deliver streaming data to users is presented. The invention uses context-based cues to extract content from both video and text ontologies. The invention provides novel techniques that semi-automatically generate a media concept hierarchy using hierarchical classifiers for representing text, closed-caption, and video features. This hierarchy is used to classify arrival of real-time news and will also be used to match users' profiles. Moreover, this hierarchy can be dynamically re-organized based upon user changes and arrival of real-time news. Matching a request with respect to a concept hierarchy is more efficient and reliable than searching specific keywords since the views of collected documents are refined as the hierarchy is traversed.

104 Claims, 9 Drawing Sheets

METHOD AND APPARATUS FOR SCANNING, PERSONALIZING, AND CASTING MULTIMEDIA DATA STREAMS VIA A COMMUNICATION NETWORK AND TELEVISION

BACKGROUND (a) Technical Field

The present invention generally relates to an apparatus and method for providing real-time multimedia content. More specifically the invention provides an apparatus and method for discovering and extracting desired data from multimedia data streams via a communication network and data interface terminal.

(b) Discussion

As the Internet matures, the number of sites offering real-time streaming data continues to increase. The widespread availability of high-speed Internet connections has made Internet-based streaming data a viable reality. The Internet, with its low entry barriers has allowed virtually any individual or business to post streaming data on the Internet. While streaming data offers many advantages over static data, it suffers from a significant disadvantage. Streaming data is necessarily linear in the time domain, meaning that a user must monitor the data until a segment of interest commences. As the number of sites carrying streaming data increases, so does the need for a system that can selectively extract desired data. Existing search engines rely on metadata, which is often provided by the content provider. Such metadata can be inaccurate and outdated or misleading. Further, even accurate and timely metadata can result in a very broad categorization. For instance a user may be interested in a specific college basketball game. The user may select a provider catering to sports fans but only spending a few minutes each hour on college basketball.

Conventional video and audio broadcasting sources, for instance, all news, all-sports, all-weather stations would like to reach a wide range of users and consequently are compelled to broadcast material that appeals to the broadest cross-section of users, this results in virtually all users spending time monitoring data that is of little or no interest to them.

Therefore there is a need for a system that would allow users to discover and receive relevant data from streaming sources. Ideally such a system would be able to search for relevant data by matching users' requests to available video and audio streams.

SUMMARY

Existing content retrieval software focuses on video retrieval based on a key word and video frame sample. The search is an off-line process and all the video sources are stored at their Website. Moreover, techniques exist that allow for the querying of video and images, based on content descriptors such as color, shape, motion, and other low-level features. The present invention provides a unique scanning technology that differs from the normal paradigm of content retrieval software since it can support filtering and matching based on content and the users' profiles. The present invention utilizes multimedia cues based on context (spatial, temporal, and user environment), and content from both video and text ontologies. The present invention utilizes novel techniques that semiautomatically generate a media concept hierarchy using hierarchical classifiers for representing text, closed-captioning, and video features. The hierarchy can be dynamically re-organized based upon user prompted changes and arrival of real-time news. Matching a request with respect to a concept hierarchy is more efficient and reliable than searching specific keywords. The invention includes a unique architecture for the discovery and retrieval of multiple streaming data sources over different multicast network topologies simultaneously.

One aspect of the present invention relates to a computer and networking method, and a system for providing real-time and personalized multimedia content discovery service for Internet and TV users. This service will allow the users to discover and receive relevant contents from multiple and diverse streaming multimedia data tailored to specific users' requests or profiles. A unique broker/agent architecture and synchronization protocol matches real-time video and closed-caption contents with users' request using a metadata hierarchy. The architecture of the invention provides a "content matching" server that can be deployed at the edge or at the core of a plurality of networks. Additionally there could be some combination of network core and edge. For example, a deployment might occur at Internet Service Providers (ISPs) or network operation center. The client system is provided with a set of personalized script that can be automatically executed to access diverse data sources located at multiple local and/or remote sites, without intervention from the server. In addition, this invention promotes different configurations of the server and client systems to adapt to Internet and satellite network topologies.

In one aspect, the present invention provides an apparatus and method for discovering and extracting desired data from multimedia data streams via a communication network and data interface terminal. One of the advantages of the invention is the ability to alter the conventionally linear nature of streaming data. This aspect of the present invention includes a data parsing apparatus including a media browser, a media repository, a media planner, and a media matcher. The media repository includes a storage apparatus for storing information related to a semantic segment of data mapped to a hierarchy index. The media planner includes an apparatus that parses and matches a user-specific profile with a Media Concept hierarchy-based software system that is configured to extract relevant metadata describing one or more data sources that have the contents matched with the user defined interests. The media matcher includes an apparatus configured to classify data content into a concept hierarchy. In the aggregate, the components are configured to locate, extract, and classify real time data based on a user profile. The profile may be explicitly created by the user, implicitly created by the user, or created in some other manner.

In another aspect of the present invention users can discover and receive relevant data from streaming sources. Further the invention provides an apparatus and method for searching for relevant data. Relevancy may be determined by matching users' requests to available video and audio streams. The invention provides an apparatus and method wherein data sources do not need to provide content indexes. This reduces the complexity in data administration that usually requires database technical expertise and staffing. Further, some content providers do not provide indexes or provide inaccurate or misleading indexes. The invention does not require indexes to be built and stored with contents at content providers' sites. Thus, there is no need to change the data sources that usually are in content providers control. This capability also reduces risks in corrupting data sources when changes are made. Stories and News can be tailored to appropriate categories and shipped to clients at the beginning of the broadcast or right after the broadcast. Users don't have to wait for the system to be archived and indexed before the data can be queried as most archive and video database systems currently do. Another aspect of the invention provides an apparatus and method for locating, extracting and classifying real-time video, text, and audio. This apparatus and method utilize user-provided profiles to extract content from Internet, and television sources. Television, in this context is understood to include satellite propagated signals as well as more conditional ground wave propagated and cable carried signals.

BRIEF DESCRIPTION OF THE DRAWINGS

The objects, features, and advantages of the present invention will be apparent from the following detailed description with reference to the following drawings, wherein.

DETAILED DESCRIPTION

Figure 1:
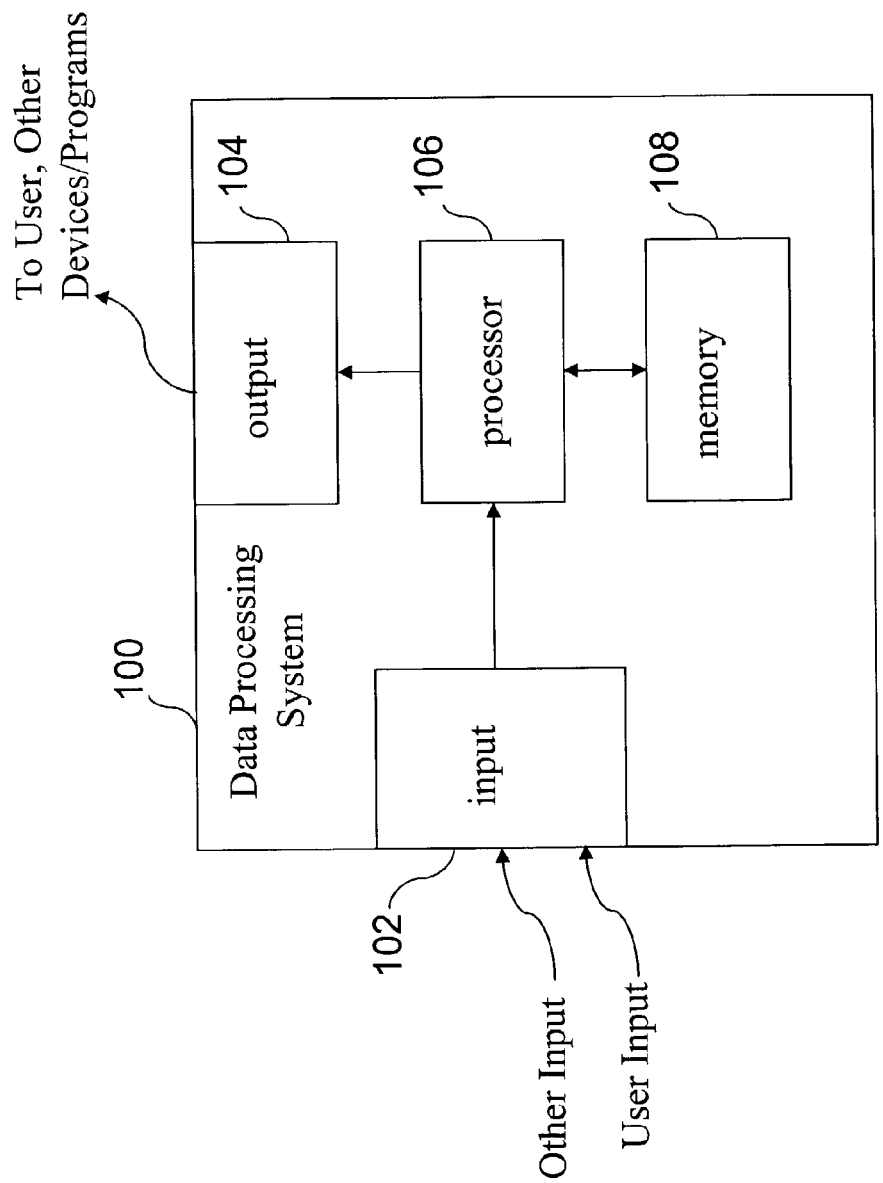
FIG. 1 is a block diagram of a computer system used in conjunction with the present invention.

The present invention generally relates to an apparatus and method for providing real-time multimedia content. More specifically the invention provides an apparatus and method for discovering and extracting desired data from multimedia data streams via a communication network and data interface terminal. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein, may be applied to a wide range of aspects. Thus, the present invention is not intended to be limited to the aspects presented, but is to be accorded the widest scope consistent with the principles and novel features disclosed herein. Furthermore it should be noted that unless explicitly stated otherwise, the figures included herein are illustrated diagrammatically and without any specific scale, as they are provided as qualitative illustrations of the concept of the present invention.

In order to provide a working frame of reference, first a glossary of terms used in the description and claims is given as a central resource for the reader. Next, a discussion of various physical aspects of the present invention is provided. Finally, a discussion is provided to give an understanding of the specific details.

(1) Glossary

Before describing the specific details of the present invention, a centralized location is provided in which various terms used herein and in the claims are defined. The glossary provided is intended to provide the reader with a feel for the intended meaning of the terms, but is not intended to convey the entire scope of each term. Rather, the glossary is intended to supplement the rest of the specification in more accurately explaining the terms used.

Means—The term "means" as used with respect to this invention generally indicates a set of operations to be performed on a computer, and may represent pieces of a whole program or individual, separable, software modules. Non-limiting examples of "means" include computer program code (source or object code) and "hard-coded" electronics (i.e. computer operations coded into a computer chip). The "means" may be stored in the memory of a computer or on a computer readable medium. Note that "means" in the context of hardware is a general term, indicating a piece of hardware suitable for performing the function of the "means."

(2) Principal Aspects

The present invention has three principal aspects. The first is a system for scanning, personalizing, and casting multimedia data streams via a communication network and television, and is typically in the form of a computer system or computer network operating software or in the form of a "hard-coded" instruction set. This system may take a variety of forms with a variety of hardware devices, and may include computer networks, handheld computing devices, cellular networks, satellite networks, and other communication devices. The second physical aspect is a method, typically in the form of software or hardware, operated using a data processing system (computer or computer network). The third principal physical aspect is a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other non-limiting examples of computer readable media include hard disks, read only memory (ROM), and flash-type memories. These aspects will be described in more detail below.

A block diagram depicting the components of a computer system used in the present invention is provided in FIG. 1. The data processing system 100 comprises an input 102 for receiving information in the form of user input as well as input from other devices, databases, and/or programs. It should be noted that the input 102 may include multiple "ports." An output 104 is connected with the processor for communicating with other devices as well as for providing output to a user. Output may also be provided to other other programs, e.g. to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software to be manipulated by commands to the processor. A plurality of data processing systems 100, along with other devices, forms a communication network in which the present invention may operate.

Figure 2:
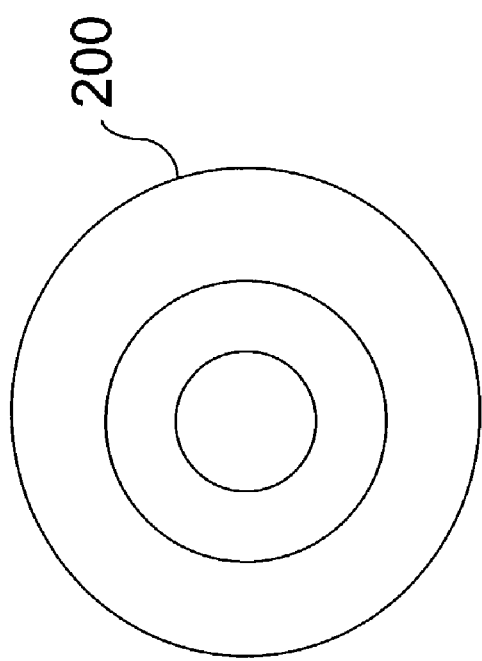
FIG. 2 is an example of a computer program product aspect of the present invention, in the form of a computer-readable medium.

An illustrative diagram of a computer program product embodying the present invention is depicted in FIG. 2. The computer program product 200 is depicted as an optical disk such as a CD or DVD. However, as mentioned previously, the computer program product generally represents computer readable code stored on any compatible computer readable medium.

(3) Discussion

The present invention provides a software method and an associated hardware apparatus which is configured to perform off-line searches of video content stored at a host website. The present invention also provides for the selective retrieval of content that matches certain user-specified criteria. The invention's unique scanning technology differs from the normal paradigm of content retrieval software in that it supports filtering and matching. The filtering and matching can be applied to streaming data content and can conform to user-provided profiles. Additionally, the present invention uses novel multimedia cues as part of a technique based on context (spatial, temporal, and user environment), and content from both video and text ontologies for a domain. One such domain could include sports. The present invention utilizes an approach that relies on novel techniques that semi-automatically generate a media concept hierarchy using a plurality of hierarchical classifiers for representing text, closed-captioning, and video features. The hierarchy is used to classify real-time news and may also be used to match users' profiles. Moreover, this hierarchy can be dynamically re-organized based on external or internal changes and by the arrival of real-time news. Matching a request with respect to a concept hierarchy is significantly more efficient and reliable than searching for specific keywords, since the views of collected documents are refined as the progress is made down in the hierarchy. This hierarchy is also more efficient than current image query techniques that require more extensive and time-consuming indexing, especially for live video and closed-captioned data. In addition, the invention includes a unique architecture for the discovery and retrieval of multiple streaming data sources over different multicast network topologies.

The invention uses a media concept hierarchy to locate relevant sources and to retrieve data that matches users' profiles. The invention also utilizes cues from video, text, and audio to perform the extraction process. This contrasts with other systems that rely on individual images, or text retrieval techniques. In addition, the present invention is configured to extract and match on-line data rather than archived images or text from static media data server. The architecture and synchronization protocols of the present invention support dynamic classification and extraction based on current data as it happens and may be augmented with relevant past data. While conventional static Internet search techniques and representations are based on static past data, the present invention provides intelligent matching techniques that are configured to deliver the most current data, filtered to reflect the user's interests. The rapid availability of the data means that the user may access the data before it is available on a conventional cataloged Internet data archive centers, and similar database servers.

The present invention has application in the information services sector and will also find application in police and defense applications such as Situational Awareness, various Command and Control systems, and Intelligence Analysis. Further, the invention may also find application as a mechanism for delivering real-time multimedia data streams to mobile users such as Internet enabled vehicles. In addition to conventional static Web-based information, live TV and Internet programs may be broadcast (or multicast) through the Internet to home users from many sources and over many different channels. The broadcast programs include up-to-date live events, news, sport, finance, trade shows, and international news that are composed of large amount of video, audio, closed-caption, and text. The contents from the broadcast programs may be filtered to conform to users' interests. The invention allows users to first locate and receive only multimedia data from sources that are relevant to their interests.

One aspect of the present invention provides a Semantic Data Network (SDN). The SDN is a method for defining a metadata (description) data network that is separated from the data sources and can support new contents and requests updates. This SDN represents semantic data based on classification and categorization techniques, not syntactic data that usually represent data types, length, and record block structure. The invention uses a unique vector-based protocol to represent the semantic data. This same vector-based protocol can be used both during the classification process and during the query process.

Real-time Media Casting architecture, for the purposes of this disclosure, defines processes for classifying incoming video and audio streams into a SDN, and for matching users' profiles with the SDN. The invention also shows how to configure components of this system for both Internet and satellite network topologies. By combining the Semantic Data Network with the Real-time Media Casting architecture, the invention provides unique networking and computing methods for locating and receiving relevant video and audio streams over the Internet and via satellite networks (TV and/or PC).

The present invention defines a metadata network that is separated from the data sources and can support new content updates. This framework consists of a global concept hierarchy that is organized semantically based on the news contents for different domains, e.g., sport, finance, etc. Unlike other database management systems, where the metadata is syntactically stored locally with the data, and is static, the present invention provides a global concept hierarchy that represents semantic information based on the source model. Moreover, it stores metadata separately from the contents and can be dynamically changed to reflect new contents update. In this framework, the invention can also use the same matching function for both the discovery process of contents as it becomes available through multimedia data streams, and the query process based on user's interests. This matching function is based on a unique one-dimensional vector space that will improve the accuracy of retrieving data while supporting fuzzy, or inexact, requests.

As the amount of on-line data increases, the design of an efficient algorithm or an approach to access the data has become of great interest and importance, especially for broadcast multimedia data. Creating and organizing the semantic description of the underlying data is an important step in achieving efficient discovery of and access to relevant data. This semantic description is modeled based on the news content real-time delivering system. Specifically, the invention semi-automatically creates and classifies all related information and events into a set of hierarchies. In the case of sport scores, the invention semi-automatically creates and classifies all related sports information and events into a set of hierarchies. The invention employs a unique hierarchical classifier to efficiently organize and relate video and text into the concept hierarchy. A hierarchical classifier comprises a set of video and text classifiers that may be utilized to classify a subtopic in a concept hierarchy. A concept hierarchy consists of a set of nodes where each node represents a specific topic. A topic is represented by a node in level n has subtopics in level n-1. The topics become more general and more specific as the hierarchy is traversed upward and downward, respectively. Based on the concept hierarchy, it is possible to determine a measure or a standard (i.e., classifier) by which it is possible to classify text and video data.

A specific topic is represented as a vector of weights for terms (or words) from a vocabulary. Although a variety of approaches can be used to design document classifiers using the bag of words representation, the invention is uses a relatively simple, yet effective, approach based on the term frequency inverse document frequency classifier. Term frequency inverse document frequency classifiers are described and well know in the literature. The term frequency inverse document frequency approach to document classification works as follows:

Let V be the vocabulary used.

Let d be a document or a short Newscast.

Figure 3:
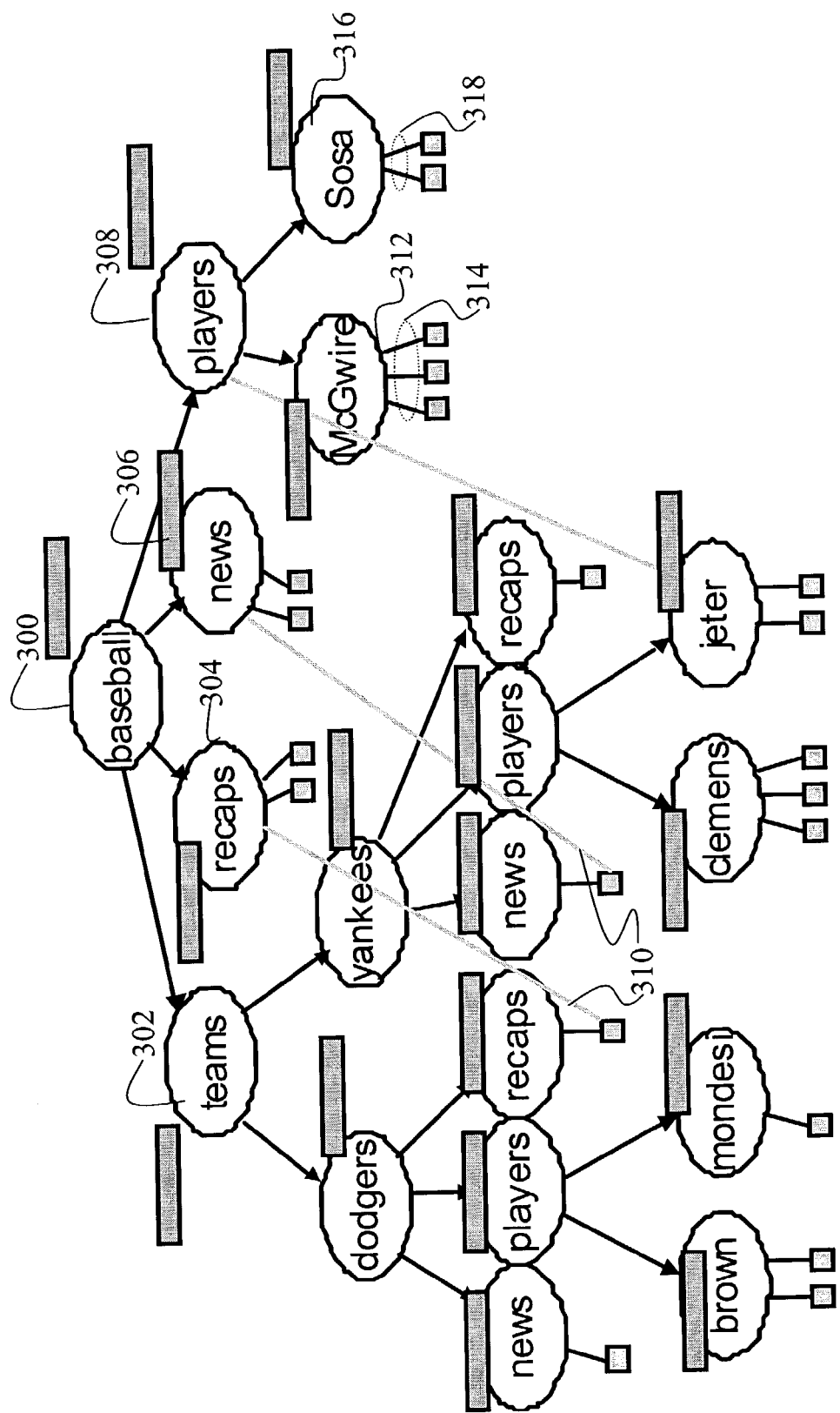
FIG. 3 is a depiction of a hierarchical classifier generated for the concept hierarchy of pro-baseball where each node has a corresponding representative vector displayed as a small rectangle next to the node that contains the Term Frequency—Inverse Document Frequency values.

The document is processed using stemming and stopping procedures to obtain a bag of words for document d. Stemming is the procedure to find a unique representation (e.g., root) for a word, and stopping is the procedure to eliminate common words from the text. Let $w_i$ be the ith word in the vocabulary V. The term frequency of $w_i$, TF ($w_i$, d) is the number of times $w_i$ occurs in d. The document frequency of $w_i$, $DF_i(w_i)$ is the number of documents in which $w_i$ occurs at least once. The inverse document frequency of $w_i$, IDF($w_i$), is defined as IDF($w_i$)=log(|D|/DF ($w_i$)), where |D| is the total number of documents below the parent of the current node under consideration. Then, the term frequency-inverse document frequency of $w_i$, TFIDF($w_i$), is given by term frequency ($w_i$, d)* inverse document frequency ($w_i$). The vector representation of a document d is represented by [term frequency inverse document frequency($w_1$, d) term frequency inverse document frequency(w2, d) . . . term frequency inverse document frequency(w|v|,d)]. A term frequency inverse document frequency document classifier is constructed as follows: Let C be a collection of document classes of interest. A prototype vector (for each node in the concept hierarchy) is generated for each class in C by adding up all the document vectors in the class. FIG. 3 shows a hierarchical classifier generated for the concept hierarchy of pro-baseball where each node has a corresponding representative vector that contains the term frequency inverse document frequency values.

The invention uses a media concept hierarchy for discovering and representing the relevant sources and also for querying. Querying with respect to a concept hierarchy using term frequency inverse document frequency values is significantly more efficient and reliable than searching specific keywords since the views of collected documents are refined as the hierarchy branches out. Thus, if the subject is baseball 300, there might be branch-out sub-topics including teams 302, recaps 304, news 306, and players 308. In this example, the corresponding representative vectors 310 of the media concept hierarchy contain the term frequency inverse document frequency values that are associated with the recaps 304 and news 306 subtopics. Similarly, McGwire 312 has representative vectors 314 that contain the term frequency inverse document frequency values and Sosa 316 has two representative vectors 318 that contain the relevant term frequency inverse document frequency values. While not specifically shown, it is further possible that there could be representative vectors containing term frequency inverse document frequency values associated with players.

Figure 4:
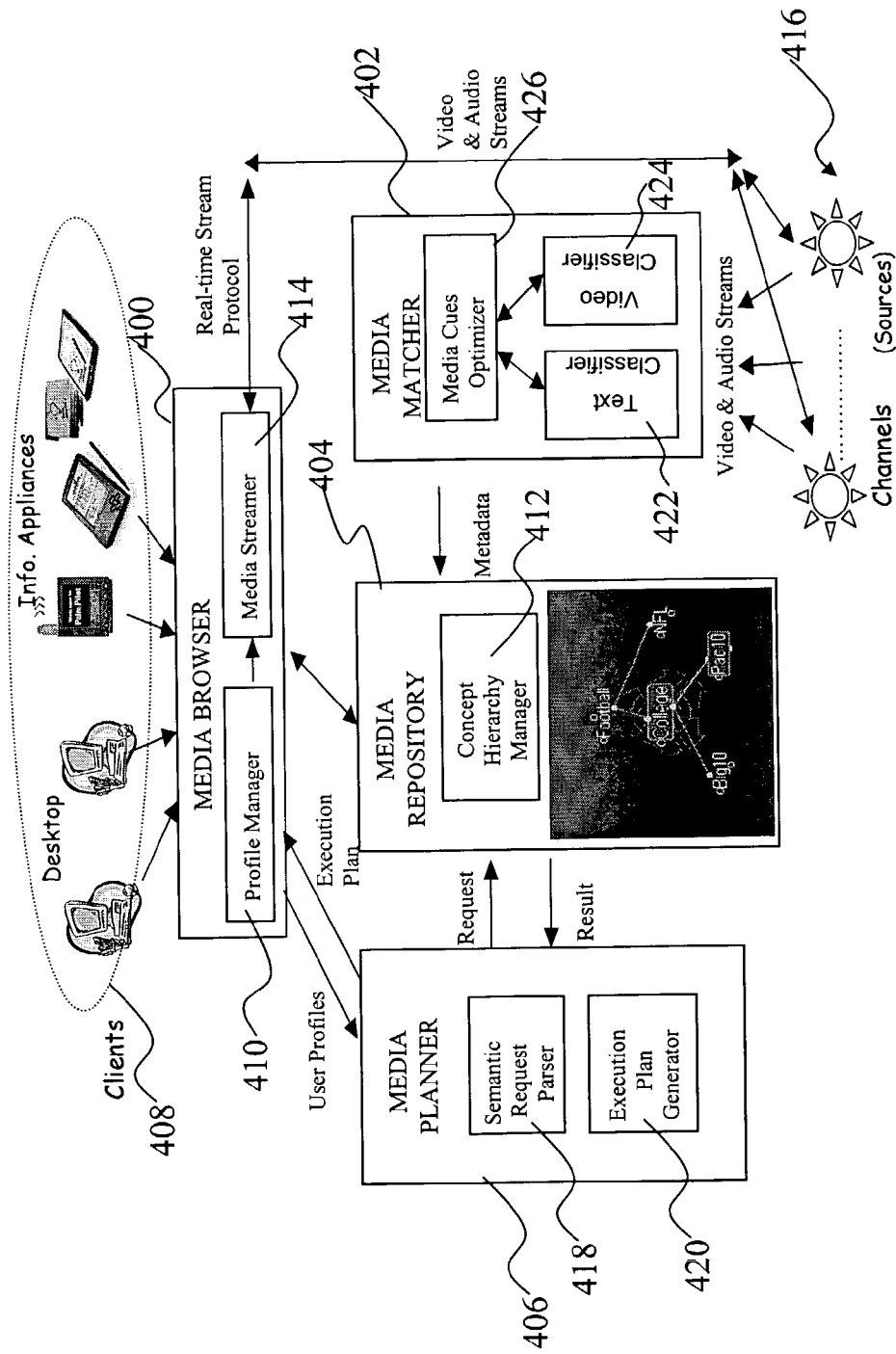
FIG. 4 is a depiction of the architecture of the present invention and includes four major modules: media browser, media matcher, media repository, and media planner.

Shown in FIG. 4, the unique "Real-Time Media Casting" architecture with hyperlink synchronization protocols, according to one aspect of the present invention, allows users to transparently locate and receive video and audio data from one or multiple sources. The resulting data are personalized and localized to the users' requests and activities. This architecture is comprised of four major modules: media browser 400, a media matcher 402, media repository 404, and media planner 406. The client 408 uses the media browser 400 to specify interests using a text or concept hierarchy and/or to identify relevant data sources to be streamed. The media matcher 402 matches real-time audio and video streams broadcast over an Internet channel with pre-defined concept hierarchies, and stores pointers to related audio and video streams within proper nodes in the media concept hierarchy. The media planner 406 matches the users' requests with the media concept hierarchy and builds a personalized execution plan to retrieve relevant data sources for each user's profile/ interest. This plan includes a description of how to stream and synchronize the video and audio from multiple remote sources. The media planner 406 will send the plan back to the media browser for the user to browse. The media repository 404 stores and manages the media concept hierarchy and users' profiles. The media repository 404 reorganizes the media concept hierarchy to enhance the semantic description (metadata) based on new requests and new data streams. Next, greater detail regarding these individual components will be provided.

Media Browser. The media browser 400 allows users to specify the users' profiles using a set of key words or a user hierarchy (pre-defined path). The user hierarchy is a subset of the media concept hierarchy that is stored in the media repository 404. All users' profiles also are stored in the media repository (media repository) 404. The profile manager 410 coordinates with the concept hierarchy manager 412 to receive updates when new contents are added or changed. The media streamer 414 receives an execution plan from the media planner 406 and starts streaming the data from different data sources 416. The media streamer 414 aggregates the data stream in a random order and displays the data to the user. The media browser 400 can be executed in any platform that can run a Internet Real-Time Protocol for video and audio streaming. The execution plan, for example, may consist of a set of scripts represented in HTML language.

The Media Planner. The media planner 406 parses and matches the content hierarchy, and extracts relevant metadata describing the data sources that have contents which match a user's request. The media planner 406 takes users' profiles as inputs and produces a script file containing command to locate the data sources and to stream the data. The profile takes one of two forms, a list of keywords and/or short paragraphs provided by the user, or a subset of paths from the media concept hierarchy. Once parsed these profiles might be stored by user within the media repository 404, so that this profile information may be accessed or modified in the future. The semantic request parser 418 converts the specified subset of paths into a set of keywords and performs the matching with the media concept hierarchy. The media matcher 402 described below has been used to train a predefined media concept hierarchy by a vector-based score of closed caption data. The invention is then used to test such a hierarchy by other closed captions. Consequently, the hierarchy possesses knowledge about which class a text should belong to, and it helps the invention to match the users' profiles inputs as a set of keywords with the media concept hierarchy to locate the relevant data sources. Considering the input as a set of keywords, the semantic request parser 418 will treat it as a closed caption inputs used for the media matcher. Thus, the semantic request parser 418 converts the profile to term frequency inverse document frequency vector to search for the target class. Since any class (node) in the media concept hierarchy close enough to the input will be selected, the target class may not be limited to one. The following pseudo code more clearly exemplifies the media planner 406 function. Note that other similar equivalent programs can be readily developed for the same purpose. Thus, this pseudocode is intended merely as a non-limiting example.

Let t=TF(keyword input).
Class=$\phi$
NodeSet=root
while(NodeSet≠$\phi$) do
begin
  i. Retrieve a node $node_i$ from NodeSet: NodeSet=NodeSet-$node_i$
  ii. Retrieve the prototype vector: c=TERM FREQUENCY INVERSE DOCUMENT FREQUENCY($node_i$).
  iii. Retrieve the threshold: $\theta$=Threshold($node_i$).
  iv. Compute the TERM FREQUENCY INVERSE DOCUMENT FREQUENCY of user input: n=IDF($node_i$)×t.
    1. Compute the similarity between n and c: s=cos(n,c).
    2. if (s>$\theta$)
      a. Class=Class ∩{c}.
      b. NodeSet=NodeSet ∩{getChildren($node_i$)}.
end
return Class In the procedure, user input does not have an inverse document frequency value, but borrows it from the node in the hierarchy. Inverse document frequency multiplying with the term frequency becomes a term frequency inverse document frequency vector, making it comparable to the prototype vector in the media concept hierarchy. After being successfully matched with the users' profile having the contents classified in the media concept hierarchy, the execution plan generator 420 generates the script of how to locate and retrieve contents from different sources from nodes in the media concept hierarchy. The final operation of the media planner 406 is to return a set of commands back to the media browser 400 to view the relevant contents. Multiple presentation layers can be built and embedded in the user's profiles to allow for heterogeneous clients (i.e., web browsers or set-top boxes). The presentation layers are constructed as a script which contains all related video information (URL, start time, and end time) that are stored in each node of the media concept hierarchy. The layers are formatted through an appropriate engine such as active server pages (ASP), or Hypertext processor for HTML (PHP), and Set Top Box (STB) mobile codes.

Two methods, discussed below, are designed to store and manage the user profiles and results. The tradeoffs between the two schemes are performance and data consistency between the media browser 400 and media planner 406.

Method 1. In this scheme, the client stores all of the user profiles and results at the client site. When the client 408 activates the media browser 400 to receive stream data, the Media Streamer component in the media browser 400 executes the results script, which in turn connects with the data sources and streams the data for display. In this scheme, if the contents are up to date or new since the last result that is already sent back to the client, the result is out of date. No performance overhead occurred from contacting the media planner since the client goes directly to the source, or sources, to receive data. If the location of the client is closed to the source, the performance of streaming the data is much better. Otherwise, the client may resort to the media planner 406 which might not be closed to the sources.

Method 2. The client system does not store all of the user profiles and results.

When the client activates the media browser 400 to receive a stream of data, the profile manager 410 contacts the media repository 404 to retrieve the user profiles and result scripts that are up-to-date with the sources. As explained the description of method, the media repository 404 needs to be closed to both client and data sources to reduce the performance overhead. In addition, a replicating the multiple media repository 404 will reduce performance overhead as well as ensure better system reliability.

The media matcher 402 listens to live broadcast from multiple sources over the Internet as well as TV channels 416. It uses a Text Classifier 422 to classify closed-captioned contents (audio and text) into relevant nodes in the hierarchy. Moreover, it will also use a video classifier 422 to classify video contents into the concept hierarchy. There are two classifier modes of operation. In the first one, the text classifier 422 and video classifier 424 can work independently to classify the incoming streams into relevant nodes in the concept hierarchy. The second mode of operation will improve the performance and the accuracy of classifying incoming streams by providing a media cues optimizer 426. The media cues optimizer 426 uses cues from text during the text classification phase to trigger the video classifier 424 at the appropriate time, or to make additional assumptions about the video, and vice versa. A set of heuristic rules is used to describe the mixed media cues, and is domain-dependent. For example, during the text classification for a football game, the system knows that there is a touchdown at time t, and assumes that the corresponding video stream for the closed-captioned transmission is approximately n frames from time t. Therefore, the system can identify the video scene that shows the touchdown without performing additional video techniques. The output of the media matcher 402 will be the media concept hierarchy 412, in the media repository 404 and each node in the hierarchy will contain information such as URLs, Start Time, and Stop Time.

The media repository 404 is created as the content hierarchy and is formed by the media matcher 402. Within each node of the hierarchy index, the invention stores information related to each semantic segment of video mapped to that index, such as: URL, date, begin time, end time, etc. These results are passed back to the media planner 406 based the upon user profile. The media repository 404 contains functions for storing the indexes in each node in the media concept hierarchy. The media repository 404 also contains functions that map both subset paths and user keywords to concrete node indexes. These are the functions used by the media planner 406 and/or media browser 400 to determine profile matches, and by the media repository 404, itself, on incoming streams to classify content and reconstruct the hierarchy. At the core of the media repository 404 is a database of the users of the system.

The design of the present invention allows the above components to reside at different locations in the network and run separately. The components may also be configured as a client system that is composed of the media browser 400 and a server system (Internet Portal) that is further composed of the media planner 406, the media repository 404, and the media matcher 402. Each configuration has its own advantages based on the network topology. In the next section, the invention is configured to provide a system architecture with application in wireline Internet, cellular (Personal Communication Service) networks, and satellite networks.

Figure 5:
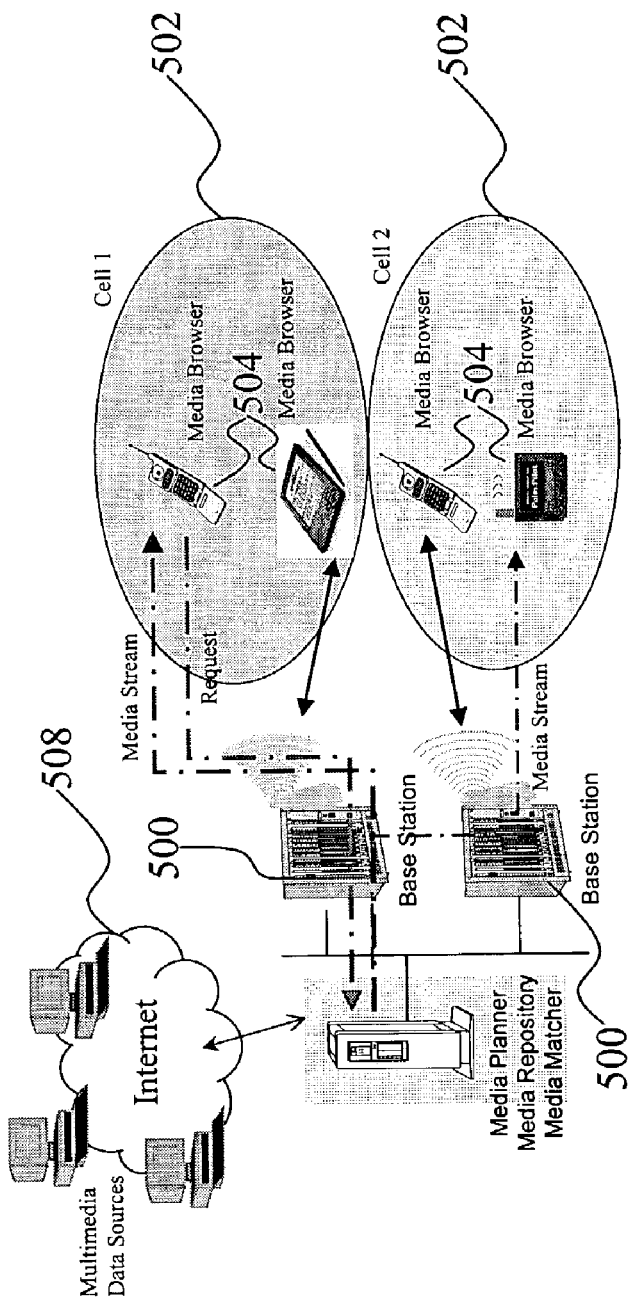
FIG. 5 is a depiction of a real-time media data casting architecture as it might exist over a cellular (PCS) network.

This section describes different media streaming system architectures for different broadcast/multicast network topologies. A cellular network as it relates to the present invention is depicted in FIG. 5. The cellular network is comprised of several base stations 500, one for each local region. These local regions are referred to as cells 502. The rest of the networks are handsets 504 or other computing devices used by the clients. The base stations 500 interact with each other for exchanging and managing administrative information and client handoffs. The media browser 400 described in conjunction with FIG. 4 can be at the client handset 504, and the media planner 406, media repository 404, and the media matcher 402 components reside at a local base station 500 that is connected to the Internet 508 (generally through a router). In this system, the client specifies the profiles and sends them to the base station 500 using the cellular network infrastructure. At the base station 500, the media matcher 402 listens to data sources streamed over the Internet 508, categorizes them into the media concept hierarchy, matches with the profiles, generates a retrieval plan, and stores the plan within the media repository 404. When the user activates a handset 504 to retrieve streaming data, and the media browser 400 sends the request to the media repository 404 located at the local base station 500. The media repository 404 searches a match using the media concept hierarchy, and then executes the plan by contacting the data sources directly and streams the data back to the client handset 504. If matches cannot be found, the media concept hierarchy will then send the search request to other base stations 500. All the mobility of the client handset 504 during the request can be managed by current technology in cellular handoffs. In this architecture, for the worst-case scenario, requests and data might be routed from one base station 500 to another, especially when the users are moving constantly.

Figure 6:
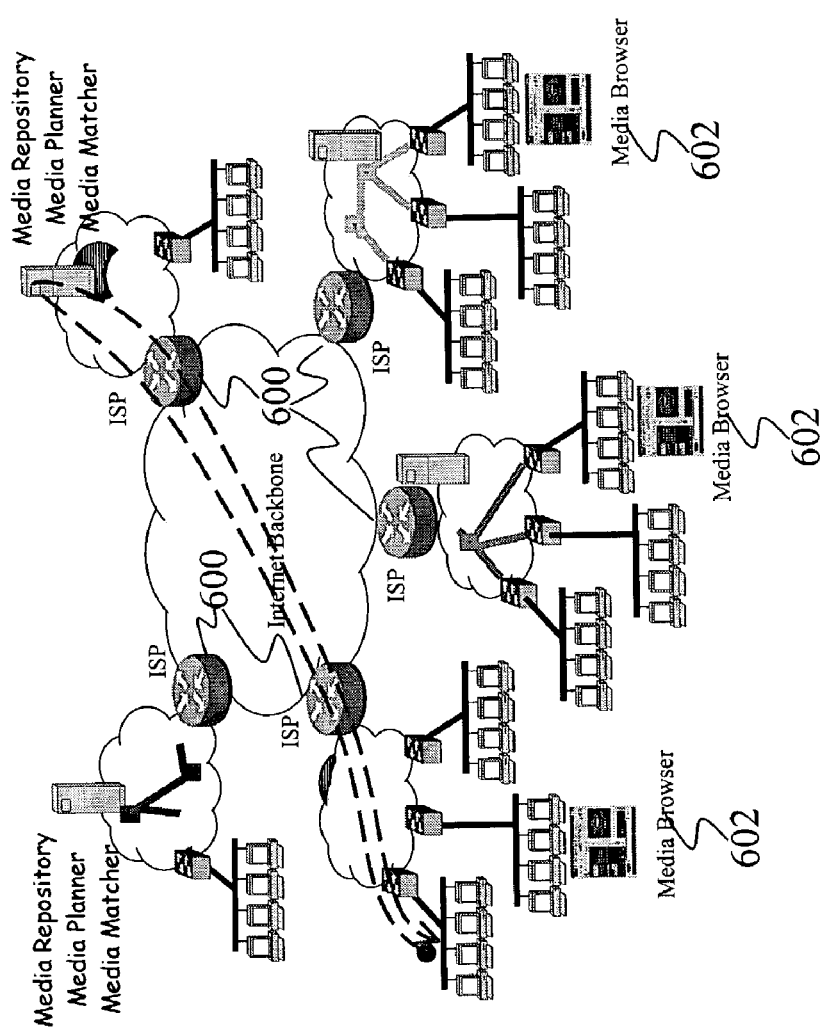
FIG. 6 is a depiction of a real-time media data casting architecture as it might exist over the more conventional wireline Internet.

An aspect of the present invention, as it relates to current Internet Service Providers is set forth in FIG. 6. Internet Service Providers 600 or ISPs provide Internet connection to end-users, often through media browsers 602. The ISPs 600 can host the media planner 406, media repository 404, and media matcher 402 components, as set forth previously. In this aspect, the client system only includes the media browser 400. In this aspect both methods 1 and 2, described above, can be used.

Figure 7:
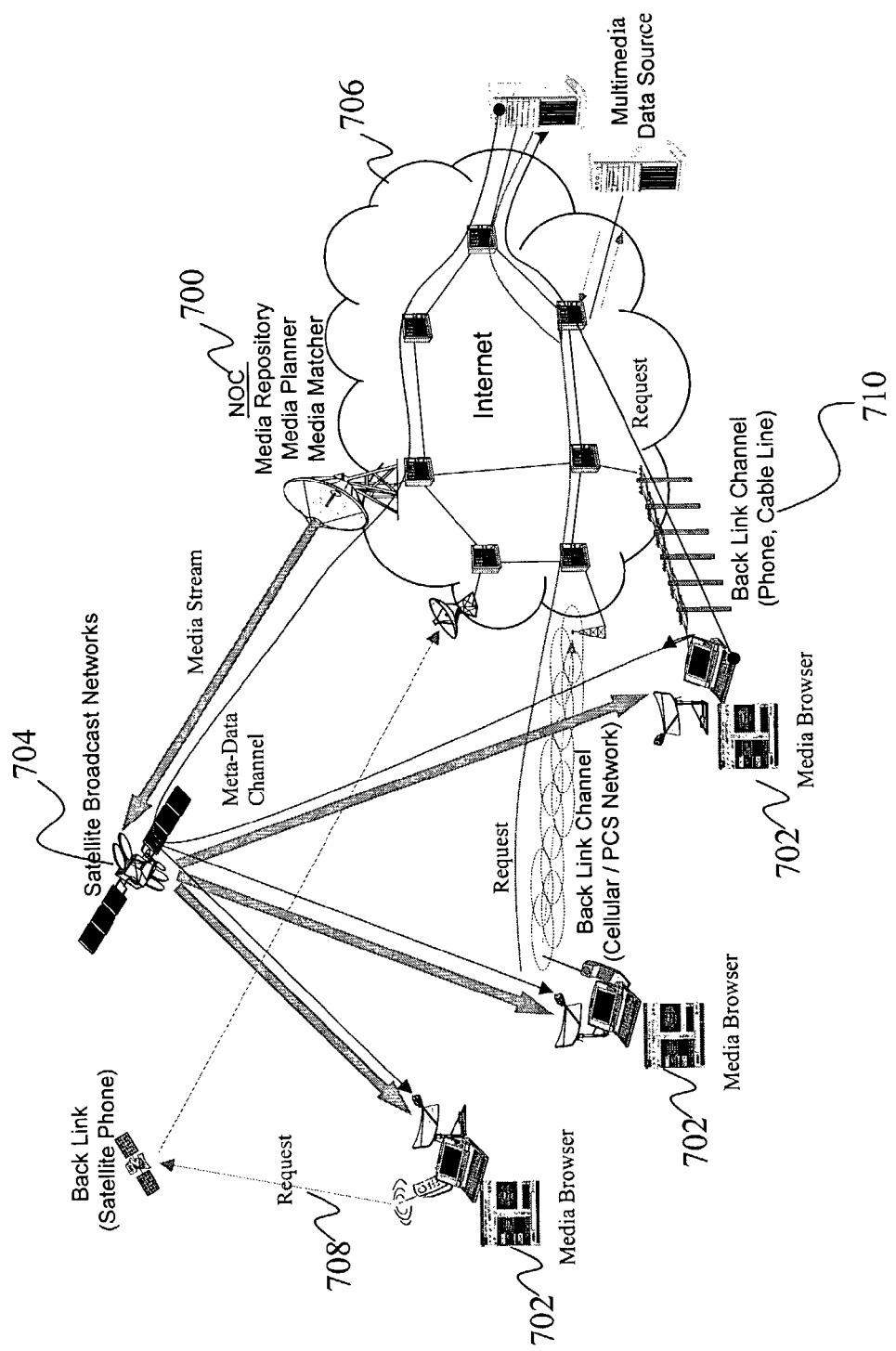
FIG. 7 is a depiction of a real-time media casting architecture over a satellite network—with direct links to end-users.

In another aspect of the present invention, set forth in FIG. 7 a satellite television network architecture comprising a network operation center 700 and clients' Earth terminals 702 (set-top-box, PCs, WebTV, etc.) is presented. The client has a downlink connection directly with the satellite 704. The network operation center 700 sends the data to the satellite 704 and the satellite 704 broadcasts it to the client 702 through the downlink connection. Requests from the client system will go through a back link that is usually a terrestrial network 706 (telephone or cellular system), however a satellite phone 708 based backlink or similar system could also be utilized. In this topology, all data streams are routed and are aggregated at the network operation center 700 before broadcasting to the clients 702. The media browser 400 can reside in the clients' terminals. The media matcher 402, media repository 404, and media planner 406 are installed as a server at the network operation center 700. The invention is configured to deliver personalized results to a subset of users rather than all users. This is a significant departure from conventional systems, such as TV programs that broadcast only on a specific schedule. One approach utilized by the invention includes using the backlink 710 to make a request and receive data streams from the network operation center 700, or from an ISP that can act as an intermediary storage for relevant data sources.

An alternative approach is to use one satellite channel to deliver the media concept hierarchy, execution plan, and data streams to the clients. For the execution plan, network operation center 700 adds a specific broadcast time and channel number to the URL upon matching with user profiles. Since all clients receive all profiles, execution plans, and the media concept hierarchy, the profile manager nullifies all other profiles and plans, except its own. Then, instead of connecting to the data sources to receive the data stream, the Media Streamer will now cache the data based on the broadcast time and execution plan in the client terminal and display it to the users. The back link 710 is used for sending and updating user profiles. It can also be used to receive data streams immediately, rather than to wait for the next broadcast time or when the cache is empty.

Figure 8:
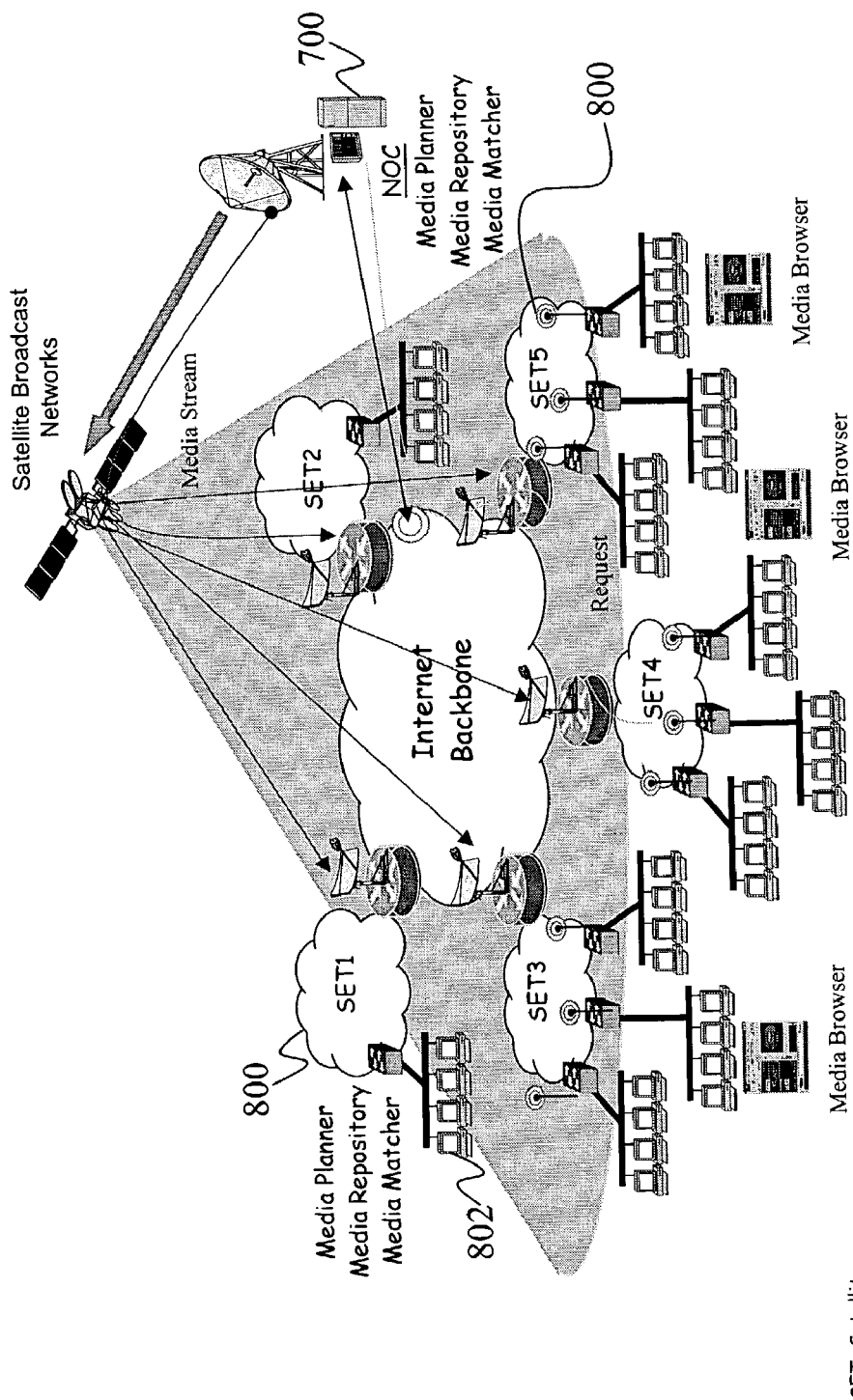
FIG. 8 is a depiction showing real-time media data casting architecture over satellite network—with indirect links to end-users.

The first two alternatives allow media streams to be directly delivered to the end-users from the network operation center 700. The next generation of satellite network architecture will include concentrated points to aggregate traffic streaming from the network operation center 700. The concentrated points will then stream the media data to end-users. This architecture distributes the traffic load generated at the network operation center 700 to the concentrated points. This is depicted in FIG. 8, where a plurality of satellite earth terminals 800 is shown. In this case, the media planner 406, media repository 404, and media matcher 402 reside at the network operation center 700. The media data streams can be replicated and/or fragmented based on the locality of a satellite earth terminal 800 and end-users, here depicted as computer terminals 802. The caching function in the Media Streamer described above is extended to all the users managed by individual satellite earth terminals 800. All the backlinks are now connected to the local satellite earth terminal 800, rather than the network operation center 700. The satellite earth terminals, in turn have the backlinks (not shown) to the network operation center 700.

Figure 9:
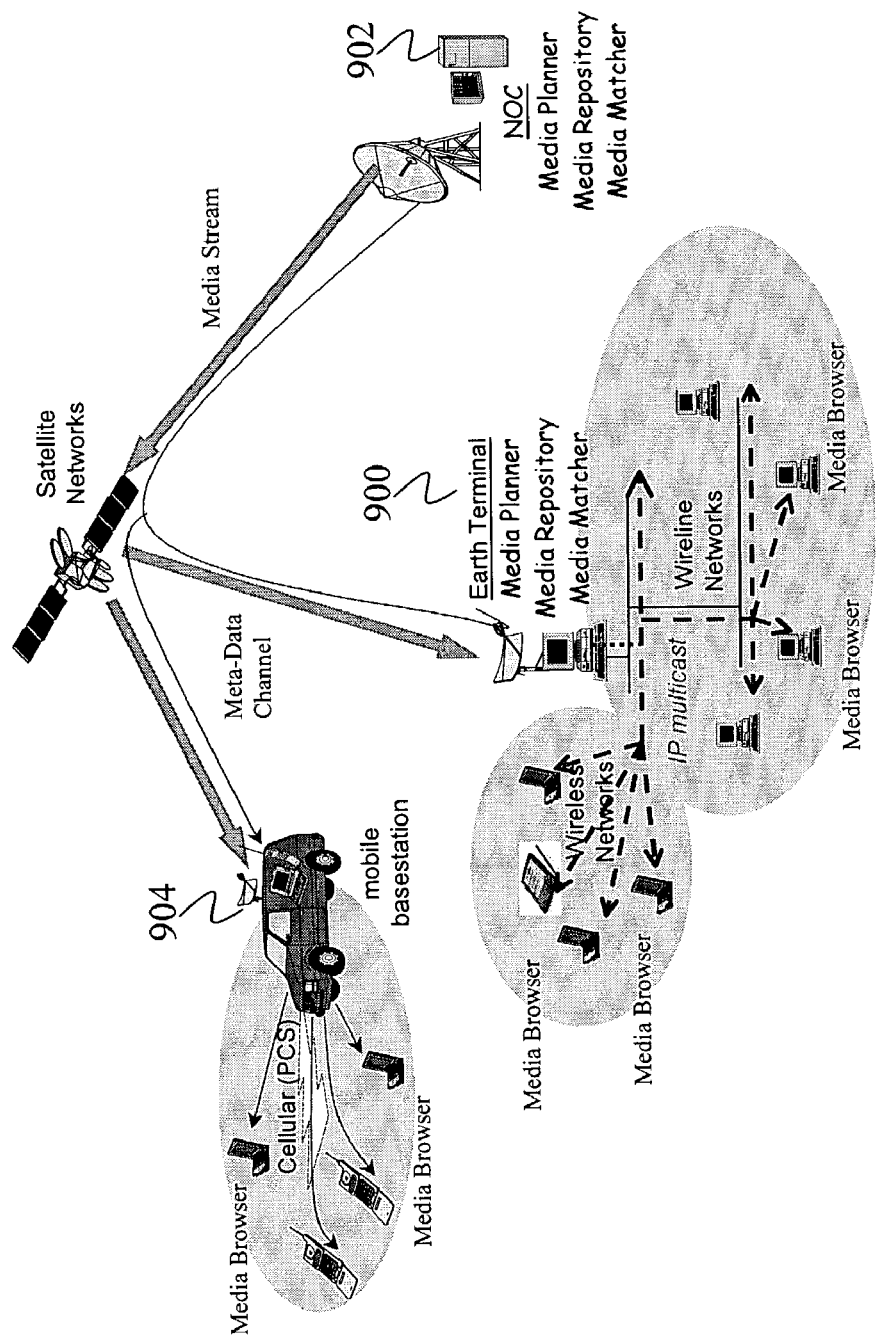
FIG. 9 is a depiction showing real-time media data operation using a hybrid architecture that includes a satellite network and terrestrial networks.

A Hybrid of Satellite and Terrestrial Network topology supports seamless connectivity among satellite and terrestrial (wireline & wireless) networks. In this topology, all media data are streamed from the network operation center 700 to the earth terminals that can act as routers to terrestrial wireline and wireless networks as set forth in FIG. 9. The earth terminal 900 is similar to the concentrated points satellite earth terminal 800 described above with respect to FIG. 8. Therefore, it is possible to install all the modules of the real-time media data casting architecture, except the media browser, in the earth terminals 900 and the network operation center 902. The caching function and the back links are similar to the previously described satellite network architecture. In the case of a mobile base-station 904 the system could operate as an earth terminal 900, with the notable exception that the base-station 904 is mobile.

What is claimed is:

1. An apparatus for scanning, personalizing, and casting multimedia data streams via a communication network comprising:

at least one data processor having software modules operating thereon, the software modules including:

a media matcher for classifying media streams based on media cues, the media cues being at least video cues and for generating a media concept hierarchy based on the classifications;

a media repository for receiving and storing the media concept hierarchy, wherein the media concept hierarchy stores descriptive information regarding the classified media streams in the form of metadata;

a media planner for receiving user information and for generating a plan based on the user information for searching the metadata stored in the media concept hierarchy to locate media streams that match the user information and for searching content in the media streams in real-time for matches with the user information; and a media browser for receiving user information and for providing the user information to the media planner for use in generating the plan, and for receiving information regarding the media streams that match the user information to present the information to the user;

wherein the media planner further comprises a semantic request parser for converting the user information into a term frequency inverse document frequency vector for use in locating media streams that match the user information;

where the media repository, the media planner, and the media matcher provide low-level data extraction and data classification at an uplink level of a satellite network;

a mobile satellite downlink station that directs streaming data from streaming data sources, to the media browser and;

a fixed network including an additional media repository, an additional media planner, and an additional media matcher to provide higher level location, extraction, and classification requests.

2. An apparatus as set forth in claim 1, further comprising a network of data processing systems in which the software modules reside.

3. An apparatus as set forth in claim 2, wherein the media matcher comprises at least one classifier selected from a group consisting of text classifiers and video classifiers, wherein the text classifiers are configured for classifying closed-captioned data into the media concept hierarchy and the video classifiers are configured to classify video content into the concept hierarchy.

4. An apparatus as set forth in claim 3, wherein the operations of the media matcher, the media repository, the media planner, and the media browser are performed in real-time to enable classification of real-time data based on the user information.

5. An apparatus as set forth in claim 4, where the user information is a user profile.

6. An apparatus as set forth in claim 5, wherein the user profile is created by explicit user information input or by implicit user behavior.

7. An apparatus as set forth in claim 6, wherein the media matcher further comprises a media cues optimizer to use cues from a text classifier to trigger the video classifier in order to further enhance media stream classification accuracy, wherein the media cues optimizer uses a set if domain-dependent heuristic rules to describe the media cues.

8. An apparatus as set forth in claim 7, wherein the media matcher is configured to receive media streams from at least one of an Internet data source, a personal communication network, a digital video network, and a satellite-based network.

9. An apparatus as set forth in claim 8, wherein the media planner locates media streams that match the user information based on multimedia cues selected from a group consisting of spatial cues.

10. An apparatus as set forth in claim 8, wherein the media planner and the media browser operate on a user data processing system and wherein the media repository and media matcher operate on a data processing system remote from the user.

11. An apparatus as set forth in claim 9, wherein the media browser operates on a user data processing system, and wherein the media planner, the media repository, and the media matcher operate on a data processing system remote from the user.

12. An apparatus as set forth in claim 11, wherein the data processing system on which the media planner, the media repository, and the media matcher operate selected from a group consisting of Internet service provider data processing systems, satellite earth terminal systems, and personal communication network servers.

13. An apparatus as set forth in claim 12, wherein the classifiers are based on term frequency inverse document frequency classifiers.

14. An apparatus as set forth in claim 13, wherein the text classifier is based on a distance metric.

15. An apparatus as set forth in claim 14, further comprising a semantic data network for providing metadata regarding media streams, where the semantic data network is external to media stream sources and is used to assist in classification and categorization of the media streams.

16. An apparatus as set forth in claim 15, wherein the media browser further comprises a profile manager for storing profiles provided by users generated by the media planner to assist in locating media streams of interest, and a media streamer to enable streaming of media streams requested by users.

17. An apparatus as set forth in claim 16, wherein the media planner further comprises an execution plan generator for generating a script, based on the user information, of how to locate and retrieve contents from different media streams classified in the media concept hierarchy.

18. An apparatus as set forth in claim 1, wherein the media matcher comprises at least one classifier selected from a group consisting of text classifiers and video classifiers, wherein the text classifiers are configured for classifying closed-captioned data into the media concept hierarchy and the video classifiers are configured to classify video content into the concept hierarchy.

19. An apparatus as set forth in claim 18, wherein the text classifier is based on a distance metric.

20. An apparatus as set forth in claim 1, wherein the operations of the media matcher, the media repository, the media planner, and the media browser are performed in real-time to enable classification of real-time data based on the user information.

21. An apparatus as set forth in claim 1, where the user information is a user profile.

22. An apparatus as set forth in claim 1, where the user information is a user profile and wherein the user profile is created by explicit user information input or by implicit user behavior, and wherein the media planner locates media streams that match the user information based on multimedia cues selected from a group consisting of user environmental cues.

23. An apparatus as set forth in claim 1, wherein the media matcher further comprises a media cues optimizer to use cues from a text classifier to trigger the video classifier in order to further enhance media stream classification accuracy, wherein the media cues optimizer uses a set of domain-dependent heuristic rules to describe the media cues.

24. An apparatus as set forth in claim 1, wherein the media matcher is configured to receive media streams from at least one of an Internet data source, a personal communication network, a digital video network, and a satellite-based network.

25. An apparatus as set forth in claim 1, wherein the media planner locates media streams that match the user information based on multimedia cues selected from a group consisting of spatial cues.

26. An apparatus as set forth in claim 1, wherein the media browser operates on a user data processing system, and wherein the media planner, the media repository, and the media matcher operate on a data processing system remote from the user.

27. An apparatus as set forth in claim 1, wherein the data processing system on which the media planner, the media repository, and the media matcher operate selected from a group consisting of Internet service provider data processing systems, satellite earth terminal systems, and personal communication network servers.

28. An apparatus as set forth in claim 1, wherein the classifiers are based on term frequency inverse document frequency classifiers.

29. An apparatus as set forth in claim 1, further comprising a semantic data network for providing metadata regarding media streams, where the semantic data network is external to media stream sources and is used to assist in classification and categorization of the media streams.

30. An apparatus as set forth in claim 1, wherein the media browser further comprises a profile manager for storing profiles provided by users generated by the media planner to assist in locating media streams of interest, and a media streamer to enable streaming of media streams requested by users.

31. An apparatus as set forth in claim 1, wherein the media planner further comprises a semantic request parser for converting the user information into a term frequency inverse document frequency vector for use in locating media streams that match the user information.

32. An apparatus as set forth in claim 1, wherein the media planner further comprises an execution plan generator for generating a script, based on the user information, of how to locate and retrieve contents from different media streams classified in the media concept hierarchy.

33. An apparatus as set forth in claim 1, wherein the media planner and the media browser operate on a user data processing system and wherein the media repository and media matcher operate on a data processing system remote from the user.

34. The apparatus as described in claim 1 wherein the media matcher further comprises: i. a text classifier configured to classify closed captioned data into relevant nodes in the hierarchy ii. a video classifier configured to classify video content into the concept hierarchy.

35. The apparatus as described in claim 1 wherein the user profile is created by at least one of the following: i. explicit user request ii. implicit user request.

36. The apparatus as described in claim 1 further comprising the media matcher that is configured to match the users request based on multimedia cues including at least one of the following: i. spatial ii. temporal or, iii. user environment.

37. The apparatus as described in claim 1 which includes a means for discovering and retrieving multiple streaming data sources over at least one of the following: i. an Internet data source ii. a personal communications network iii. a satellite based network.

38. The apparatus as described in claim 1 where existing closed-captioned data is used by the media matcher to provide the metadata for a media repository.

39. The apparatus as described in claim 1 further comprising a Semantic Data Network that is separate from the data sources and can support new content data and new request updates and represents semantic data based on at least one of the following: i. classification techniques ii. categorization techniques.

40. The apparatus as described in claim 1 further comprising a Real-time Media Casting architecture that defines processes for classifying incoming video and audio streams into a Semantic Data Network and for matching users profiles with the Semantic Data Network.

41. A method for scanning, personalizing, and casting multimedia data streams, the method comprising steps of: classifying media streams based on media cues, the media cues being at least video cues and generating a media concept hierarchy based on the classifications; receiving and storing the media concept hierarchy, wherein the media concept hierarchy stores descriptive information regarding the classified media streams in the form of metadata; receiving user information and generating a plan based on the user information for searching the metadata stored in the media concept hierarchy to locate media streams that match the user information; searching content in the media streams in real-time for matches with the user information; and receiving user information and providing the user information for use in generating the plan, and receiving information regarding the media streams that match the user information to present the information to the user:

converting the user information into a term frequency inverse document frequency vector for use in locating media streams that match the user information;

providing low-level data extraction and data classification at an uplink level of a satellite network;

utilizing a mobile satellite downlink station to direct streaming data from streaming data sources, to a media browser; and utilizing a fixed network including an additional media repository, an additional media planner, and an additional media matcher to provide higher level location, extraction, and classification requests.

42. A method as set forth in claim 41, wherein the step of classifying media streams is performed by at least one classifier selected from a group consisting of text classifiers and video classifiers, wherein the text classifiers are configured for classifying closed-captioned data into the media concept hierarchy and the video classifiers are configured to classify video content into the concept hierarchy.

43. A method as set forth in claim 42, wherein the steps in the method are performed in real-time to enable classification of real-time data based on the user information.

44. A method as set forth in claim 43, where the user information is a user profile.

45. A method as set forth in claim 44, wherein the user profile is created by explicit user information input or by implicit user behavior.

46. A method as set forth in claim 45, wherein the step of classifying media streams is performed by a media cues optimizer to use cues from a text classifier to trigger a video classifier in order to further enhance media stream classification accuracy, wherein the media cues optimizer further uses a set of domain-dependent heuristic rules to describe the media cues.

47. A method as set forth in claim 46, wherein the step of classifying media streams is performed by receiving media streams from at least one of an Internet data source, a personal communication network, a digital video network, and a satellite-based network.

48. A method as set forth in claim 47, wherein in the step of receiving user information and generating a plan, media streams are located that match the user information based on multimedia cues selected from a group consisting of spatial cues.

49. A method as set forth in claim 48, wherein the classifiers are based on term frequency inverse document frequency classifiers.

50. A method as set forth in claim 49, wherein the text classifier is based on a distance metric.

51. A method as set forth in claim 50, further comprising a step of providing metadata regarding media streams via a semantic data network, where the semantic data network is external to media stream sources and is used to assist in classification and categorization of the media streams.

52. A method as set forth in claim 51, step of receiving user information and providing user information further comprises a step of storing profiles provided by users to assist in locating media streams of interest and streaming media streams requested by users via a media streamer.

53. A method as set forth in claim 52, wherein the step of receiving user information and generating a plan further comprises a step of converting the user information into a term frequency inverse document frequency vector for use in locating media streams that match the user information.

54. A method as set forth in claim 53, wherein step of receiving user information and for generating a plan further comprises a step of generating a script, based on the user information, regarding how to locate and retrieve contents from different media streams classified in the media concept hierarchy.

55. A method as set forth in claim 41, wherein the step of classifying media streams is performed by at least one classifier selected from a group consisting of text classifiers and video classifiers, wherein the text classifiers are configured for classifying closed-captioned data into the media concept hierarchy and the video classifiers are configured to classify video content into the concept hierarchy.

56. A method as set forth in claim 55, wherein the text classifier is based on a distance metric.

57. A method as set forth in claim 41, wherein the steps in the method are performed in real-time to enable classification of real-time data based on the user information.

58. A method as set forth in claim 41, where the user information is a user profile, and wherein the media planner locates media streams that match the user information based on multimedia cues selected from a group consisting of temporal cues.

59. A method as set forth in claim 41, where the user information is a user profile and wherein the user profile is created by explicit user information input or by implicit user behavior, and wherein the media planner locates media streams that match the user information based on multimedia cues selected from a group consisting of user environmental cues.

60. A method as set forth in claim 41, wherein the step of classifying media streams is performed by a media cues optimizer to use cues from a text classifier to trigger a video classifier in order to further enhance media stream classification accuracy.

61. A method as set forth in claim 41, wherein the step of classifying media streams is performed by receiving media streams from at least one of an Internet data source, a personal communication network, a digital video network, and a satellite-based network.

62. A method as set forth in claim 41, wherein in the step of receiving user information and generating a plan, media streams are located that match the user information based on multimedia cues selected from a group consisting of spatial cues.

63. A method as set forth in claim 41, wherein the classifiers are based on term frequency inverse document frequency classifiers.

64. A method as set forth in claim 41, further comprising a step of providing metadata regarding media streams via a semantic data network, where the semantic data network is external to media stream sources and is used to assist in classification and categorization of the media streams.

65. A method as set forth in claim 41, step of receiving user information and providing user information further comprises a step of storing profiles provided by users to assist in locating media streams of interest and streaming media streams requested by users via a media streamer.

66. A method as set forth in claim 41, wherein the step of receiving user information and generating a plan further comprises a step of converting the user information into a term frequency inverse document frequency vector for use in locating media streams that match the user information.

67. A method as set forth in claim 41, wherein step of receiving user information and for generating a plan further comprises a step of generating a script, based on the user information, regarding how to locate and retrieve contents from different media streams classified in the media concept hierarchy.

68. The method as described in claim 41 wherein the media matcher includes at least one of the following: i. a text classifier configured to classify closed captioned data into relevant nodes in the hierarchy ii. a video classifier configured to classify video content into the concept hierarchy.

69. The method as described in claim 41 wherein the user specific profile is created by at least one of the following: i. explicit user request ii. implicit user request.

70. The method as described in claim 41 wherein the media matcher uses multimedia cues including at least one of the following: i. spatial ii. temporal or iii. user environment to match the user's request.

71. The method as described in claim 41 which includes a method for discovering and retrieving multiple streaming data sources over at least one of the following: i. an Internet data source ii. a personal communications network iii. a satellite based network.

72. The method as described in claim 41 where: the media repository, the media planner, and the media matcher function to extract and classify data at the uplink level of a satellite network; the mobile satellite downlink station functions to direct the data to the media browser and; a fixed network including an additional media repository, an additional media planner, and an additional media matcher function to provide higher level location, extraction, and classification requests.

73. The method as described in claim 41 where the media matcher uses existing closed-captioned data to provide the metadata to a media repository.

74. The method as described in claim 41 further utilizing a semantic data based classification and categorization technique that is separate from the data sources and supports new content and user request updates.

75. The method as described in claim 41 further defining processes for classifying incoming video and audio streams into a Semantic Data Network and for matching users profiles with the Semantic Data Network.

76. A computer program product for scanning, personalizing, and casting multimedia data streams, the computer program product comprising a non-transitory computer-readable medium having means stored thereon that are executable by a computer to cause the computer to perform operations of classifying media streams based on media cues, the media cues being at least video cues and generating a media concept hierarchy based on the classifications; receiving and storing the media concept hierarchy, wherein the media concept hierarchy stores descriptive information regarding the classified media streams in the form of metadata; receiving user information and generating a plan based on the user information for searching the metadata stored in the media concept hierarchy to locate media streams that match the user information and for searching content in the media streams in real-time for matches with the user information; and receiving user information and providing the user information for use in generating the plan, and receiving information regarding the media streams that match the user information to present the information to the user;

converting the user information into a term frequency inverse document frequency vector for use in locating media streams that match the user information;

providing low-level data extraction and data classification at an uplink level of a satellite network;

utilizing a mobile satellite downlink station to direct streaming data from streaming data sources, to a media browser; and utilizing a fixed network including an additional media repository, an additional media planner and an additional media matcher to provide higher level location, extraction, and classification requests.

77. A computer program product as set forth in claim 76, wherein the means for classifying media streams is performed by at least one classifier selected from a group consisting of text classifiers and video classifiers, wherein the text classifiers are configured for classifying closed-captioned data into the media concept hierarchy and the video classifiers are configured to classify video content into the concept hierarchy.

78. A computer program product as set forth in claim 77, wherein the operations in the means of the computer program product are performed in real-time to enable classification of real-time data based on the user information.

79. A computer program product as set forth in claim 77, wherein the text classifier is based on a distance metric.

80. A computer program product as set forth in claim 78, where the user information is a user profile.

81. A computer program product as set forth in claim 80, wherein the user profile is created by explicit user information input or by implicit user behavior.

82. A computer program product as set forth in claim 81, wherein the means for classifying media streams is performed by a media cues optimizer to use cues from a text classifier to trigger a video classifier in order to further enhance media stream classification accuracy, wherein the media cues optimizer further uses a set of domain-dependent heuristic rules to describe the media cues.

83. A computer program product as set forth in claim 82, wherein the means for classifying media streams is performed by receiving media streams from at least one of an Internet data source, a personal communication network, a digital video network, and a satellite-based network.

84. A computer program product as set forth in claim 83, wherein in the means for receiving user information and generating a plan, media streams are located that match the user information based on multimedia cues selected from a group consisting of spatial cues.

85. A computer program product as set forth in claim 84, wherein the classifiers are based on term frequency inverse document frequency classifiers.

86. A computer program product as set forth in claim 85, wherein the text classifier is based on a distance metric.

87. A computer program product as set forth in claim 86, further comprising a means for providing metadata regarding media streams via a semantic data network, where the semantic data network is external to media stream sources and is used to assist in classification and categorization of the media streams.

88. A computer program product as set forth in claim 87, means for receiving user information and providing user information further comprises a means for storing profiles provided by users to assist in locating media streams of interest and streaming media streams requested by users via a media streamer.

89. A computer program product as set forth in claim 88, wherein the means for receiving user information and generating a plan further comprises a means for converting the user information into a term frequency inverse document frequency vector for use in locating media streams that match the user information.

90. A computer program product as set forth in claim 89, wherein means for receiving user information and for generating a plan further comprises a means for generating a script, based on the user information, regarding how to locate and retrieve contents from different media streams classified in the media concept hierarchy.

91. A computer program product as set forth in claim 76, wherein the means for classifying media streams is performed by at least one classifier selected from a group consisting of text classifiers and video classifiers, wherein the text classifiers are configured for classifying closed-captioned data into the media concept hierarchy and the video classifiers are configured to classify video content into the concept hierarchy.

92. A computer program product as set forth in claim 76, wherein the operations of the means in the computer program product are performed in real-time to enable classification of real-time data based on the user information.

93. A computer program product as set forth in claim 76, where the user information is a user profile, and wherein the media planner locates media streams that match the user information based on multimedia cues selected from a group consisting of temporal cues.

94. A computer program product as set forth in claim 76, where the user information is a user profile and wherein the user profile is created by explicit user information input or by implicit user behavior, and wherein the media planner locates media streams that match the user information based on multimedia cues selected from a group consisting of user environmental cues.

95. A computer program product as set forth in claim 76, wherein the means for classifying media streams is performed by a media cues optimizer to use cues from a text classifier to trigger a video classifier in order to further enhance media stream classification accuracy, wherein the media cues optimizer further uses a set of domain-dependent heuristic rules to describe the media cues.

96. A computer program product as set forth in claim 76, wherein the means for classifying media streams is performed by receiving media streams from at least one of an Internet data source, a personal communication network, a digital video network, and a satellite-based network.

97. A computer program product as set forth in claim 76, wherein in the means for receiving user information and generating a plan, media streams are located that match the user information based on multimedia cues selected from a group consisting of spatial cues.

98. A computer program product as set forth in claim 76, wherein the classifiers are based on term frequency inverse document frequency classifiers.

99. A computer program product as set forth in claim 76, further comprising a means for providing metadata regarding media streams via a semantic data network, where the seman- 100. A computer program product as set forth in claim 76, means for receiving user information and providing user information further comprises a means for storing profiles provided by users to assist in locating media streams of interest and streaming media streams requested by users via a media streamer.

101. A computer program product as set forth in claim 76, wherein the means for receiving user information and generating a plan further comprises a means for converting the user information into a term frequency inverse document frequency vector for use in locating media streams that match the user information.

102. A computer program product as set forth in claim 76, wherein means for receiving user information and for generating a plan further comprises a means for generating a script, based on the user information, regarding how to locate and retrieve contents from different media streams classified in the media concept hierarchy.

103. A data parsing apparatus comprising: a plurality of components including i. media browser; ii. a media repository comprising a storage apparatus for storing information related to a semantic segment of data mapped to a hierarchy index; iii. a media planner comprising an apparatus that parses and matches a user specific profile with a Media Concept hierarchy that is configured to extract relevant metadata describing one or more data sources that have the contents matched with the users' request, the metadata including at least video data; iv. a media matcher comprising an apparatus configured to classify data content into the concept hierarchy, wherein said plurality of components are configured to locate, extract, and classify real-time data based on user profile;

wherein the media planner further comprises a semantic request parser for converting the user profile into a term frequency inverse document frequency vector for use in locating media streams that match the user profile;

where the media repository, the media planner, and the media matcher provide low-level data extraction and data classification at an uplink level of a satellite network;

a mobile satellite downlink station that directs streaming data from streaming data sources, to the media browser and;

a fixed network including an additional media repository, an additional media planner, and an additional media matcher to provide higher level location extraction and classification requests.

104. A data parsing method comprising: a plurality of steps including: i. receiving a user input for specific information; ii. storing a semantic segment of data mapped to a hierarchy index on a media repository; iii. parsing and matching a user specific profile with a hierarchy based software system that is configured to extract relevant metadata from one or more data sources, the metadata including at least video data, and have the extracted data matched with the users' request on a media planner; iv. using a media matcher to classify the data into the concept hierarchy, wherein said plurality of steps locate, extract, and classify real-time data based on a users' profile;

converting the user profile into a term frequency inverse document frequency vector for use in locating media streams that match the user profile;

providing low-level data extraction and data classification at an uplink level of a satellite network;

utilizing a mobile satellite downlink station to direct streaming data from streaming data sources, to a media browser; and utilizing a fixed network including an additional media repository, an additional media planner, and an additional media matcher to provide higher level location, extraction, and classification requests.

* * * * *

UNITED STATES PATENT AND TRADEMARK OFFICE
Certificate

Patent No. 7,870,279 B2                                                              Patented: January 11, 2011

On petition requesting issuance of a certificate for correction of inventorship pursuant to 35 U.S.C. 256, it has been found that the above identified patent, through error and without any deceptive intent, improperly sets forth the inventorship.
    Accordingly, it is hereby certified that the correct inventorship of this patent is: Wesley Chuang, Newburry Park, CA (US); Son Dao, Northridge, CA (US); Asha Vellaikal, Menlo Park, CA (US); Greg Kaestle, Woodland Hills, CA (US); and Jihoon Yang, Fairfax, VA (US).

Signed and Sealed this Twenty-third Day of August 2011.

<div align="right">

THU NGUYEN
*Supervisory Patent Examiner*
Art Unit 2452
Technology Center 2400

</div>